United States Patent
Sykes

(10) Patent No.: US 8,391,638 B2
(45) Date of Patent: Mar. 5, 2013

(54) HYBRID IMAGE FORMAT

(75) Inventor: Kenneth W Sykes, Oakton, VA (US)

(73) Assignee: Microsoft Corporation, Redmond, WA (US)

(*) Notice: Subject to any disclaimer, the term of this patent is extended or adjusted under 35 U.S.C. 154(b) by 1026 days.

(21) Appl. No.: 12/133,358

(22) Filed: Jun. 4, 2008

(65) Prior Publication Data

US 2009/0304303 A1 Dec. 10, 2009

(51) Int. Cl.
*G06K 9/36* (2006.01)

(52) U.S. Cl. ........ 382/284; 382/100; 382/139; 382/164; 382/166; 382/176; 382/195; 382/232; 382/239

(58) Field of Classification Search .................. None
See application file for complete search history.

(56) References Cited

U.S. PATENT DOCUMENTS

| | | | |
|---|---|---|---|
| 5,122,873 A | 6/1992 | Golin | |
| 5,223,701 A | 6/1993 | Batterman et al. | |
| 5,301,037 A | 4/1994 | Kang et al. | |
| 6,507,674 B1* | 1/2003 | Yagishita et al. | 382/239 |
| 6,731,800 B1* | 5/2004 | Barthel et al. | 382/176 |
| 6,880,122 B1* | 4/2005 | Lee et al. | 715/209 |
| 7,062,087 B1* | 6/2006 | Varga | 382/166 |
| 7,088,866 B2 | 8/2006 | Andrew | |
| 7,110,596 B2* | 9/2006 | Simard et al. | 382/166 |
| 7,116,834 B2 | 10/2006 | Malvar | |
| 7,120,297 B2* | 10/2006 | Simard et al. | 382/166 |
| 7,148,907 B2 | 12/2006 | Smith et al. | |
| 7,319,543 B2* | 1/2008 | Suzuki | 358/1.9 |
| 7,321,688 B2* | 1/2008 | Fujiwara | 382/176 |
| 7,512,274 B2* | 3/2009 | Simard et al. | 382/195 |
| 2002/0061140 A1 | 5/2002 | Kajiwara | |
| 2002/0099884 A1* | 7/2002 | Chang et al. | 710/62 |
| 2004/0096102 A1* | 5/2004 | Handley | 382/164 |
| 2004/0151376 A1 | 8/2004 | Nomura et al. | |
| 2005/0275897 A1* | 12/2005 | Fan et al. | 358/2.1 |
| 2005/0286752 A1* | 12/2005 | Takiguchi | 382/139 |
| 2005/0286776 A1* | 12/2005 | Bai et al. | 382/232 |
| 2007/0094075 A1* | 4/2007 | Graham et al. | 705/14 |
| 2007/0103731 A1* | 5/2007 | Tse et al. | 358/3.27 |
| 2007/0229894 A1* | 10/2007 | Siemens et al. | 358/1.16 |
| 2007/0292049 A1 | 12/2007 | Liu et al. | |
| 2008/0292130 A1* | 11/2008 | Nafarieh et al. | 382/100 |

OTHER PUBLICATIONS

"Get Yourself Noticed with a Favicon", retrieved at << http://www.fontstuff.com/frontpage/fptutl6.htm >>, pp. 4.

* cited by examiner

*Primary Examiner* — Tsung-Yin Tsai
(74) *Attorney, Agent, or Firm* — Wolfe-SBMC

(57) ABSTRACT

Hybrid image format techniques are described in which multiple resolution images are concatenated to a standard bitmap image to create a hybrid image file. The hybrid image file is created through combining a relatively low resolution image with the additional images in a multi-frame format having higher resolution. The hybrid image file may contain data detectable to signal that higher resolution images are available in the hybrid image file. A hybrid aware application may be configured to detect and output a higher resolution image from the hybrid image file based on detection of the data. A legacy application that is not configured to detect the data may be unaware of higher resolution images contained in the hybrid image file, and accordingly outputs the relatively low resolution image.

15 Claims, 5 Drawing Sheets

HYBRID IMAGE FORMAT

BACKGROUND

High resolution displays are becoming more prevalent. As the ability of displays to render higher and higher resolution images has increased, application developers have responded by providing images that take advantage of the higher resolution (e.g., increasing DPI). However, enabling an existing application to use high-resolution images may involve significant redevelopment of the application. This may be quite time consuming and costly for the developer. Further, errors may be encountered when an existing application that has not been enabled to use a high-resolution image attempts to load such an image. Such image loading errors may be quite frustrating to users who may not understand why the error occurred.

SUMMARY

Hybrid image format techniques are described in which multiple resolution images are concatenated to a standard bitmap image to create a hybrid image file. An image is authored in a bitmap format having a relatively low resolution. Additional images are authored having higher resolution. The additional images may be maintained in a multi-frame format. A hybrid image file is created that combines the relatively low resolution image with the additional images in the multi-frame format having higher resolution. The hybrid image file may further contain data which is detectable to signal that higher resolution images are available in the hybrid image file.

In an implementation, an application enabled to use the higher resolution images is configured to detect the detectable data. Thus, a higher resolution image from the hybrid image file may be output by the application when the data is detected. When the detectable data is omitted or goes undetected, the relatively low resolution image may be output. Further, a legacy application that is not configured to detect the data may be unaware of higher resolution images that are contained in the hybrid image file. Accordingly, the legacy application interacts with the hybrid image file as though the hybrid image file was a standard bitmap image and outputs the relatively low resolution image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As the quality of images available to users has increased, the resolution of images processed by computing devices has correspondingly increased. However, enabling an existing application to use high-resolution images may involve significant redevelopment of the application. This may be quite time consuming and costly for the developer.

Hybrid images format techniques are described in which a hybrid image file combines a relatively low resolution image with one or more additional images in a multi-frame format having higher resolution. The hybrid image file may also contain data that is detectable to signal that one or more higher resolution images are available in the hybrid image file.

In an implementation, an application enabled to use the higher resolution images is configured to process the detectable data to identify whether higher resolution images are available. Such an application may be referenced herein as a hybrid aware application. Thus, a higher resolution image from the hybrid image file may be output by the application when the detectable data is detected. When the higher resolution images are not available or go undetected, the relatively low resolution image may be output.

In an implementation, some applications may not be configured to recognize or support higher resolution images that may be contained in the hybrid image file. Such an application may be referenced herein as a legacy application. For instance, the legacy application may not be configured to process the detectable data and may not be aware of the portion of the hybrid image file having the multi-frame format. Thus, the legacy application may interact with the hybrid image file as though the hybrid image file was a standard bitmap image. Accordingly, the legacy application outputs the relatively low resolution image.

In the following discussion, an example environment is first described that is operable to perform hybrid image format techniques. Example procedures are then described that may be employed in the example environment, as well as in other environments. Although these techniques are described as employed within an example computing environment in the following discussion, it should be readily apparent that these techniques may be incorporated within a variety of environments without departing from the spirit and scope thereof.

Example Environment

Figure 1:
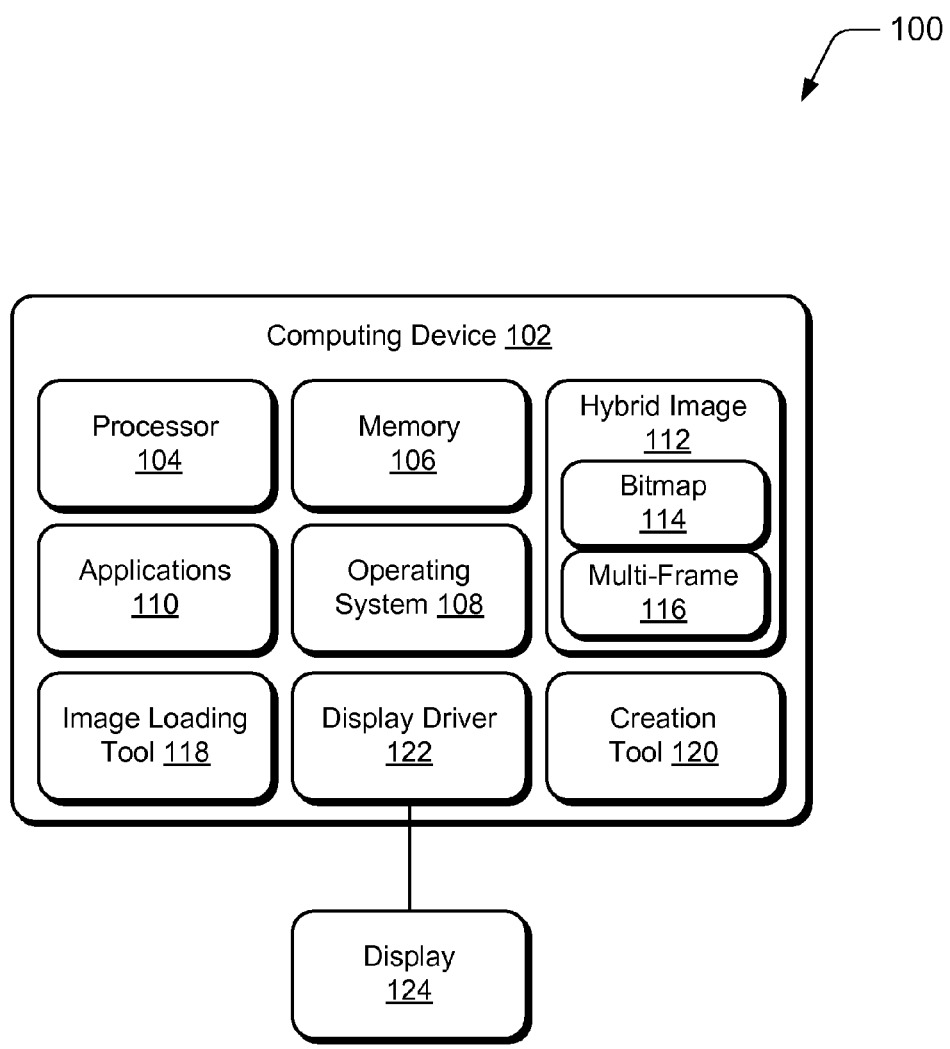
FIG. 1 depicts an example environment in which hybrid image format techniques may be employed.

FIG. 1 is an illustration of an environment 100 in an example implementation that is operable to employ hybrid image format techniques described herein. The illustrated environment 100 includes a computing device 102 having one or more processors 104 and a memory 106. Computing device 102 may be configured in a variety of ways. For example, computing device 102 may be configured as a computer that is capable of communicating over a network, such as a desktop computer, a mobile station, a laptop, an entertainment appliance, a set-top box communicatively coupled to a display device, a wireless phone, a game console, and so forth. In the following description a referenced component, such as computing device 102, may refer to one or more entities. Therefore, by convention, reference may be made to a single entity (e.g., the computing device 102) or multiple entities (e.g., the computing devices 102, the plurality of computing devices 102, and so on) using the same reference number.

Processors 104 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The one or more processors 104 may perform single threaded and multi-threaded operations. Additionally, although a single memory 106 is shown for the computing device 102, a wide variety of types and combinations of computer readable memories may be employed including volatile and non-volatile memory and/or storage media. For example computer readable memories/media may include but are not limited to random access memory (RAM), hard disk memory, read only memory (ROM), flash memory, video memory, removable medium memory, and other types of computer-readable media that are typically associated with a computing device 102 to store data, executable instructions, and the like.

The computing device 102 is further illustrated as including an operating system 108 and a variety of applications 110. The one or more processors 104 may retrieve and execute computer-program instructions from applications 110 to provide a wide range of functionality to the computing device 102, including but not limited to office productivity, email, media management, printing, networking, web-browsing, and so forth. A variety of program data related to the applications 110 is contemplated examples of which include office documents, multimedia files, emails, data files, web pages, user profile and/or preference data, and so forth.

The program data of a computing device 102 may also include various images which may be stored in the memory 106. Various image processing may be performed to display, print, output, or otherwise manipulate the images. For example, an application 110 may be executed via the processor 104 to display an image as part of a user interface output by the application 110. Other images may be displayed as components of an operating system 108, such as icons, controls, menus, background images, and so forth. Images may also include digital photographs, scanned images, and so forth. A variety of other examples are also contemplated.

The example of FIG. 1 depicts the computing device 102 as having one or more hybrid images 112 representative of images formatted in accordance with hybrid image format techniques. A hybrid image 112 may have a bitmap portion 114 and a multi-frame portion 116. The bitmap portion 114 may encode a bitmap image having a relatively low resolution. The multi-frame portion 116 may be configured to encode one or more images as higher resolution alternatives to the bitmap image. Thus, the format of the hybrid images 112 described herein enables encoding of multiples resolution images as a hybrid image 112, e.g., a single image file.

The computing device 102 is further illustrated as including an image loading tool 118. Image loading tool 118 is representative of a variety of hybrid aware functionality operable by a computing device. For instance, image loading tool 118 may include at least functionality to interact with a hybrid image 112, such as to load, output, and/or otherwise interact with the hybrid image 112. Image loading tool 118 is further representative of functionality to determine when higher resolution alternatives are encoded in the multi-frame portion 116. When higher resolution alternatives are available, image loading tool 118 may select and/or cause output of a higher resolution alternative. When higher resolution alternatives are not available, image loading tool 118 may cause output of the bitmap image encoded in the bitmap portion 114. While depicted as a stand-alone module in FIG. 1, the image loading tool 118 may also be implemented as a sub-module of another application 110. The image loading tool 118 may be implemented in a variety of ways to provide hybrid aware functionality to applications 110 and computing devices 102. Additional discussion of techniques to interact with hybrid images 112 may be found in relation to FIGS. 4-5.

The computing device 102 is further illustrated as including a creation tool 120. Creation tool 120 is representative of functionality operable to create hybrid images 112. Creation tool 120 may form a hybrid image 112 from a bitmap image and one or more higher resolution images that may be developed as alternatives to the bitmap image. It is noted that the creation tool 120 may operate on a separate computing device 102 to create hybrid images 112 in a separate environment (e.g., a development environment). Once created, a hybrid image 112 may be distributed for end-use by many computing devices 102. However, for simplicity sake, the creation tool 120 is depicted as a component of the illustrated computing device 102 of FIG. 1. Additional discussion of techniques to create hybrid images 112 may be found in relation to FIG. 3.

Computing device 102 may output images encoded in portions of the hybrid image 112. For example, computing device 102 may be configured to output images, user interfaces, and/or other content through a display driver 122 that enables output of the images via a corresponding display 124. A variety of displays 124 are contemplated, such as an LCD display, a CRT monitor, a plasma display or other suitable displays 124. The capabilities of these various displays 124 to present images at different resolutions may also vary. Accordingly, a hybrid image 112 may be employed to encode alternate images having a range of resolutions. Thus, hybrid images 112 may enable presentation of a suitable one of a plurality of alternate images on a wide range of displays 124 having various capabilities.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide a hybrid bitmap format are platform independent, meaning that the techniques may be implemented on a variety of commercial computing platforms having a variety of processors.

Figure 2:
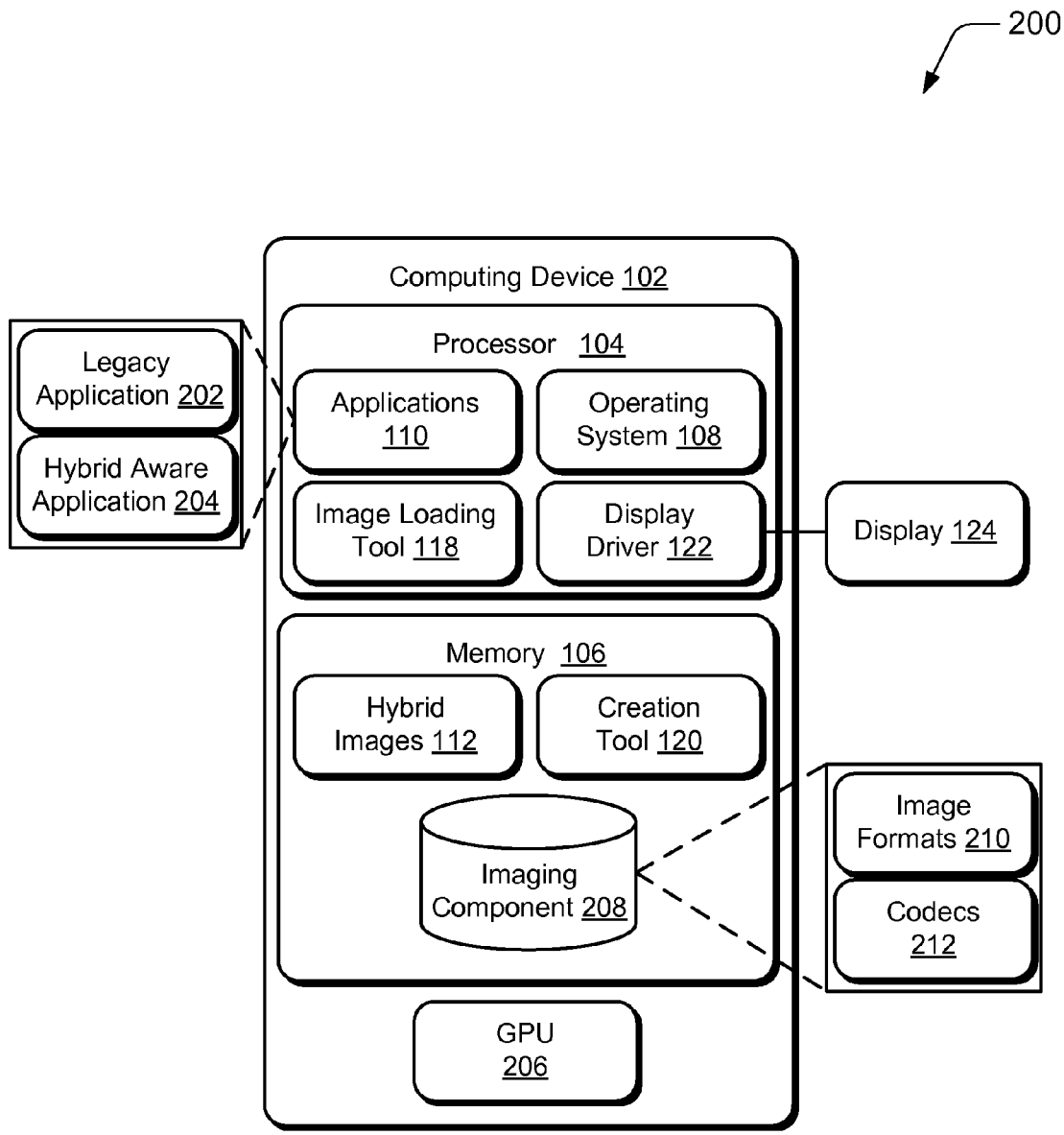
FIG. 2 depicts an example computing device of FIG. 1 to perform hybrid image format techniques showing aspects in greater detail.

FIG. 2 depicts an example implementation 200 showing aspects of the computing device 102 to perform hybrid image format techniques in greater detail. In this example, the computing device 102 is depicted as including a processor 104 and memory 106 as described in relation to FIG. 1. The processor 104 is illustrated as executing the operating system 108, applications 110, the image loading tool 118, and display driver 122.

Applications 110 are illustrated as including one or more legacy applications 202 and one or more hybrid aware applications 204. A legacy application 202 is an application 110 that may not be configured to recognize or support higher resolution images that may be contained in a hybrid image 112. For instance, the legacy application 202 may not be configured to process detectable data contained within a hybrid image 112. Thus, the legacy application 202 may be unaware of a portion of the hybrid image 112 having the multi-frame format. As such, legacy application may interact with the hybrid image 112 as though the hybrid image 112 was a standard bitmap image. Accordingly, the legacy application 202 when interacting with the hybrid image 112 file may output the relatively low resolution image encoded in the bitmap portion 114.

A hybrid aware application 204 is an application 110 that is enabled to detect and/or use the higher resolution images encoded in a hybrid image 112. In particular, hybrid aware applications 204 may be configured to process the detectable data to identify when higher resolution images are available. Thus, a higher resolution image encoded in a multi-frame portion 116 of hybrid image 112 may be output by the hybrid aware application 204 when detectable data is detected. When the higher resolution images are not available or go undetected the relatively low resolution image may be output.

The hybrid image format techniques permit legacy applications 202 to interact with a hybrid image 112 as though the hybrid image was a standard bitmap image. Thus, legacy application 202 may be unaware of the multi-frame portion 116. At the same time hybrid aware applications 204 may engage in a variety of increasingly sophisticated interactions with a hybrid image 112, such as to detect a multi-frame portion 116, identify one or more images contained in the multi-frame portions 116, select from among the images encoded in the hybrid image 112, output one or more selected images, and so forth. As discussed previously, hybrid awareness of hybrid aware applications 204 may be implemented via the image loading tool 118, further discussion of which may be found in relation to FIG. 5.

While a single processor 104 is depicted, the illustrated processor 104 may be representative of multiple processors operable to perform various tasks associated with block based image processing techniques. In the illustrated example, computing device 102 also includes a dedicated graphics processing unit (GPU) 206 configured to perform various graphics rendering tasks. Functionality provided by the GPU 206 may include controlling aspects of resolution, pixel shading operations, color depth, print rendering, texture mapping, and other tasks associated with processing of images such as forming, bitmap transfers and painting, image decoding, window resizing and repositioning, line drawing, font scaling, polygon drawing, and so on.

The GPU 206 may be capable of handling these processing tasks in hardware at greater speeds than software executed on the one or more processors 104. Thus, the dedicated processing capability of the GPU 206 may reduce the workload of the processors 104 and free up system resources for other tasks. The GPU 206 may be operated under the influence of the operating system 108 and/or an application 110 to manage graphic processing tasks. Thus, a variety of processing functionality (e.g., the one or more processors 104 and the GPU 202) may be employed in various combinations to form and/or output images, including the hybrid images 112.

Memory 106 is depicted as storing hybrid images 112 that may be created using the creation tool 120. Creation tool 120 is illustrated as stored in memory 106 and is also executable on the processor 104. As noted in the discussion of FIG. 1, creation tool 120 may also be implemented in a separate development environment.

Memory 106 also includes an imaging component 208. The imaging component 208 represents functionality that may be employed to encode and/or decode images in various formats, including images that may be provided in portions of a hybrid image 112. In an implementation, imaging component 208 includes a database of image formats, encoders, decoders, and/or related data that may be referenced to create, modify, and/or output images. For instance, imaging component 208 is illustrated as having one or more image formats 210 and one or more corresponding codecs 212.

To output an image, an application 110 may interact with the imaging component 208 to identify an image format 210 and obtain a corresponding codec 212. The codecs 212 may be configured to enable processing of the image file by the application 110. Thus, codecs 212 are representative of a variety of encoders and decoders corresponding to the various image formats 210. Further, the imaging component 208 may be representative of a variety of suitable libraries and information (e.g., database, dynamic link libraries (DLLs) shared resources/data, codecs 212, image formats 210, and so forth) that may be employed to read/write images in a variety of formats, and that may be employed by a computing device 102 and/or various applications 110.

A variety of image formats 210 and codecs 212 are contemplated that may be supported by imaging component 208. In accordance with hybrid image format techniques discussed herein, imaging component 208 may support one or more multi-frame formats suitable for hybrid images 112. Tagged Image File Format (TIFF) is one example of a multi-frame format suitable for use with hybrid images 112. A variety of other formats, codecs 212, and corresponding data to enable encoding and/or decoding of images are contemplated. Thus, the imaging component 208 may support loading and saving images in a variety of formats examples of which include but are not limited to: BMP, TIFF, PNG, JPEG, and GIF formats.

Further, imaging component 208 may be implemented in a variety of ways. For instance, imaging component 208 may be a stand-alone component (as illustrated), integrated with operating system 108, located remotely in a network accessible location, and so on. In an implementation, imaging component 208 may be dedicated to processing of hybrid images 112 and related techniques to output alternate images encoded therein. Alternatively, imaging component 208 may represent a general image imaging component that is operable to perform a variety of image processing tasks, some of which may be related to hybrid images 112 and formats described herein. For instance, imaging component 208 may be representative of one or more application programming interfaces (APIs) of an operating system 108 and/or related resources, data, DLLs and the like. Thus, imaging component 208 may be employed to process hybrid images 112 and/or to process other images and formats that may be used by computing devices 102 and corresponding applications 110.

Example Procedures

The following discussion describes techniques related to hybrid image format that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1 and the example implementation 200 of a computing device 102 of FIG. 2.

Figure 3:
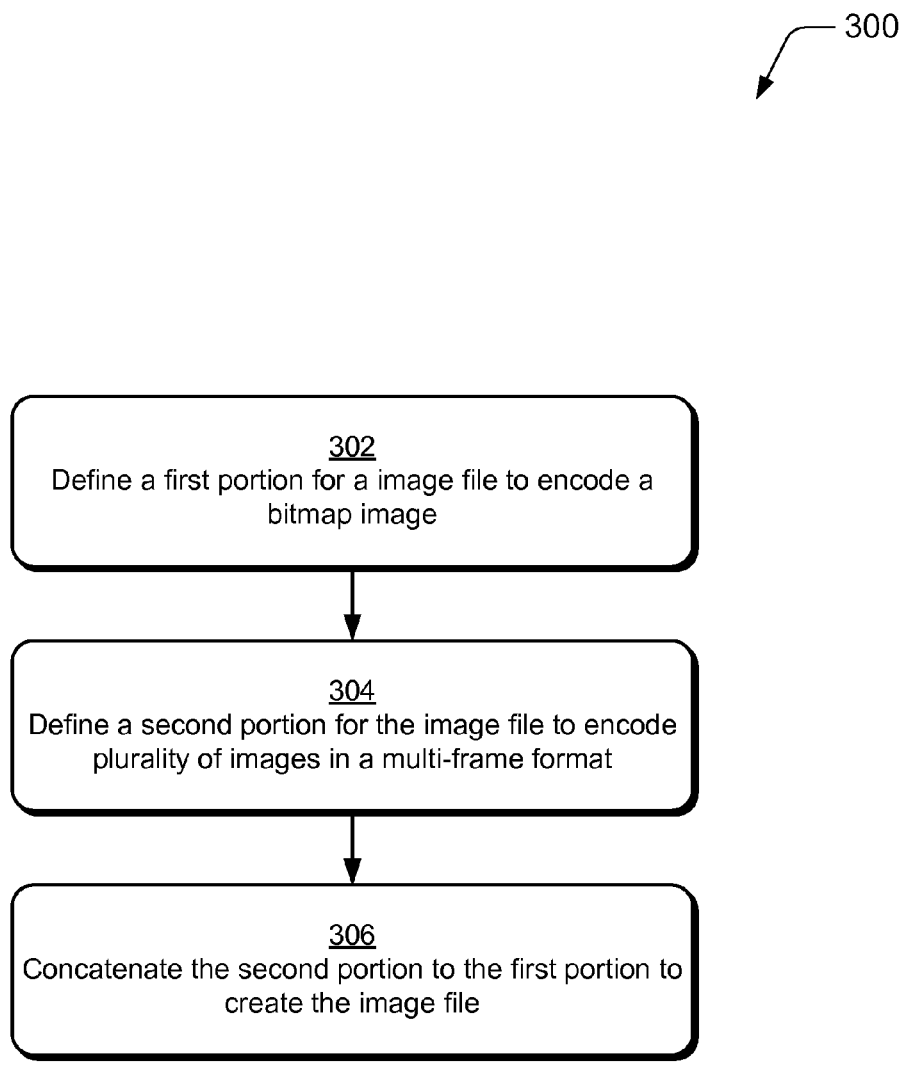
FIG. 3 depicts an example procedure in which an image is created in accordance with a hybrid image format.

FIG. 3 depicts an example procedure 300 in which an image is created in accordance with a hybrid image format. A first portion is defined for an image file to encode a bitmap image (block 302). For example, image creation tool 120 may be executed via processor 104 of a computing device 102 and a development environment to produce a hybrid image 112. A hybrid image 112 may be based upon a newly created or existing bitmap image. More particularly, creation tool 120 may form a bitmap portion 114 to encode a bitmap image. For the purpose of example, assume that the bitmap image is an icon image for a browser application.

To create the bitmap portion 114 for the hybrid image 112, creation tool 120 may interact with imaging component 208 to encode a bitmap image. As noted, imaging component 208 may includes various codecs 212 corresponding to a variety of image formats 210. Creation tool 120 and/or imaging component 208 may also implement a scaler operable to modify size and/or resolution of an image. Further, creation tool 120 and/or imaging component 208 may implement format conversion tools operable to translate images between image formats 210. Thus, through interaction with the imaging component 208, the creation tool 120 may be employed to author a bitmap image through processing and/or modifications of one or more existing images. Existing images used to create a bitmap image for a hybrid image 112 may be existing bitmaps and/or images other formats converted to bitmap using the conversion tools.

In an implementation, creation tool 120 may also import, download, upload or otherwise obtain an existing bitmap image for use with a hybrid image 112. By way of example and without limitation, a bitmap image may be encoded in a standard bitmap format that uses a resolution of 96 dots per inch (DPI). The created bitmap image, for the browser icon in this example, may then be encoded in the bitmap portion 114 of the hybrid image 112.

A second portion is defined for the image file to encode a plurality of images in a multi-frame format (block 304). Continuing the preceding example, a second portion may be defined for the hybrid image 112 to encode one or more alternative icon images for the browser. In particular, creation tool 120 may create a multi-frame portion 116 to encode one or more images. Creation tool 120 may interact with the imaging component 208 to utilize the image formats 210, codecs 212, scaler, and conversion tools as previously described and to create the multi-frame portion 116. Each image may be encoded as an individual frame of the multi-frame portion 116. Further, each image may have a resolution that is greater than the bit map image encoded in the bitmap portion 114. As noted, tagged information file format (TIFF) is one example of a multi-frame format suitable for the described hybrid file format techniques. However, creation tool 120 may use a variety of multi-frame formats that may be supported by the imaging component 208, of which TIFF is but one example.

The second portion is concatenated to the first portion to create the image file (Block 306). For instance, creation tool 120 may operate to concatenate the bitmap portion 114 created per block 302 to the multi-frame portion 116 created per block 304. In an implementation, the creation tool 102 performs a binary concatenation to join the bitmap portion 114 and the multi-frame portion 116 as the hybrid image 112. In the continuing example, the bitmap portion 114 encodes a relatively low resolution image for the browser icon. The multi-frame portion 116 may encode one or more alternate images for the browser icon as individual frames. Thus, the hybrid image 112 includes a plurality of alternate images for the browser icon.

The following TABLE 1 represents one illustrative example of a hybrid format that may be employed with the hybrid image format techniques described herein:

TABLE 1

Example Hybrid Image File Format

| Offset (decimal) | Structure | Field | Size | Comments |
|---|---|---|---|---|
| 0 | BITMAPFILEHEADER | bfType | 2 | 'BM' |
| 2 | BITMAPFILEHEADER | bfSize | 4 | File size |
| 6 | BITMAPFILEHEADER | bfReserved1 | 2 | Unused |
| 8 | BITMAPFILEHEADER | bfReserved2 | 2 | Unused |
| 10 | BITMAPFILEHEADER | bfOffBits | 4 | Offset from start of BITMAPFILEHEADER to the bitmap bits |
| 14 | BITMAPINFOHEADER | biSize | 4 | Size of header |
| 18 | BITMAPINFOHEADER | biWidth | 4 | Width in pixels |
| 22 | BITMAPINFOHEADER | biHeight | 4 | Height in pixels |
| 26 | BITMAPINFOHEADER | biPlanes | 2 | number of planes |
| 28 | BITMAPINFOHEADER | biBitCount | 2 | number of bits per pixel |
| 30 | BITMAPINFOHEADER | biCompression | 4 | compression method (0 = uncompressed) |
| 34 | BITMAPINFOHEADER | biSizeImage | 4 | size of bitmap data in bytes |
| 38 | BITMAPINFOHEADER | biXPelsPerMeter | 4 | application-defined physical size of image |
| 42 | BITMAPINFOHEADER | biYPelsPerMeter | 4 | application-defined physical size of image |
| 46 | BITMAPINFOHEADER | biClrUsed | 4 | number of entries in color table (0 = based on bpp) |

TABLE 1-continued

Example Hybrid Image File Format

| Offset (decimal) | Structure | Field | Size | Comments |
|---|---|---|---|---|
| 50 | BITMAPINFOHEADER | biClrImportant | 4 | number of "important" entries at head of table |
| | <Additional fields if BITMAPINFOHEADERV4 or BITMAPINFOHEADERV5 used> | | | |
| | <Color table if applicable (array of RGBQUADs)> | | | |
| bfOffBits | <BitmapBits> | | | |
| mulit-frame data | <Additional images stored in multiple frame image format such as TIFF> | | | |

TABLE 1 illustrates fields of a standard bitmap file, which may include a variety of fields in a file header (offset 0 to 10), info header (offset 14-50), additional header fields in some bitmaps, and a color table if applicable. The bit map image data is represented by the row labeled "bfOffbits". Collectively these fields are representative of the bitmap portion 114 of a hybrid image 112. TABLE 1 further illustrates a row labeled "multi-frame data" that has been concatenated to the bitmap portion 114. The row labeled "multi-frame data" represents the multi-frame portion 116 of the hybrid image 112, which may be used to encode one or more additional images in a multiple-frame image format, such as TIFF.

Once the hybrid image 112 has been created, such as through the example procedure 300, the hybrid image 112 may then be stored in memory 106 or other suitable memory location and/or may be written for storage to various computer-readable media. Further, the hybrid image 112 may be incorporated into an application 110, distributed for use with a variety of computing devices 102, packaged into a DLL or as another common resource, and/or may be used in a variety of other ways by computing devices 102 and applications 110. As discussed in greater detail with respect to FIG. 4, when the hybrid image 112 is encountered by a legacy application 202, the legacy application 202 may interact with the hybrid image 112 as though it was a standard bitmap file. When the hybrid image 112 is encountered by a hybrid aware application 204, the hybrid aware application 204 may determine when the multi-frame portion 116 includes one or more images and may interact with the hybrid image 112 based on the determination. Further discussion of interactions of hybrid aware applications 204 with hybrid images 112 may be found in relation to FIG. 5.

Figure 4:
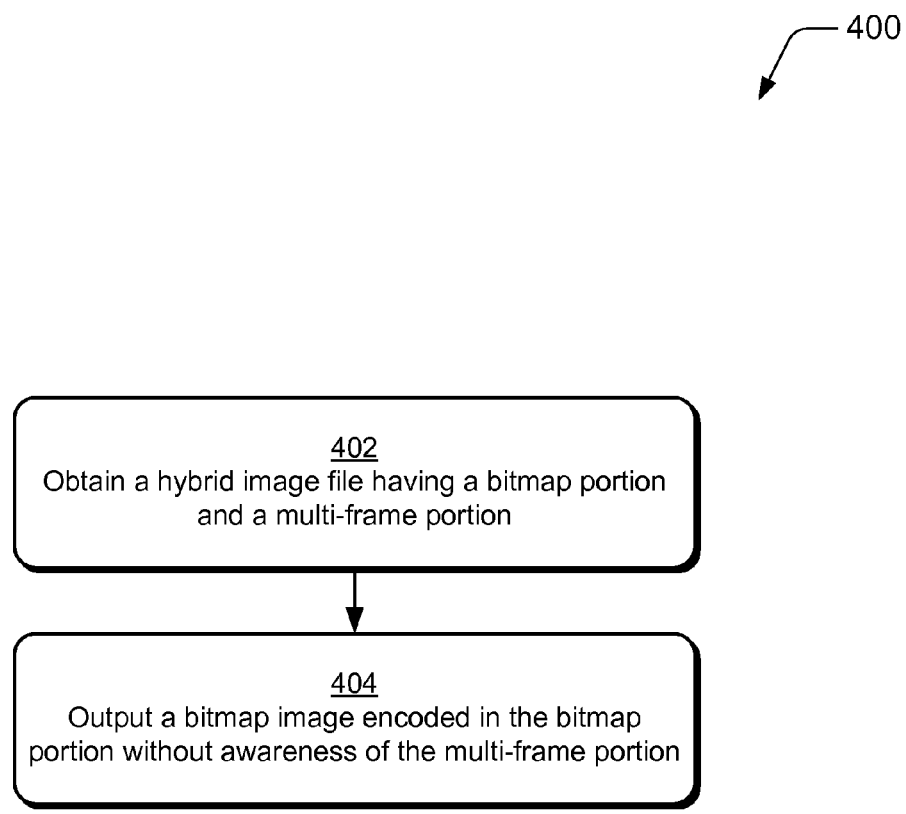
FIG. 4 depicts an example procedure in which image encoded in a bitmap portion of a hybrid image is output by a legacy application.

FIG. 4 depicts an example procedure 400 in which an image encoded in a bitmap portion of a hybrid image is output by an application interacting with the image, without being aware of a multi-frame portion of the hybrid image. Procedure 400 may be performed by a legacy application 202 when encountering a hybrid image 112. A hybrid image file having a bitmap portion and a multi-frame portion is obtained (block 402). For example, creation tool 120 may be employed to create a variety of hybrid images 112 as discussed with respect to FIG. 3. Examples of such hybrid images 112 that may be created include but are not limited to images used as part of a user interface (UI) output by an application 110, a component of an operating system 108, icons, UI controls, menus, background images, digital images and photos, and so forth.

Hybrid images 112 may be distributed for use by a variety of computing devices 102, for instance, in conjunction with an operating system 108 or an application 110. In an implementation, hybrid images 112 may be distributed by way of one or more DLLs or other suitable resources. The DLLs or other suitable resources may be referenced by applications 110 through one or more APIs of an operating system 108. Further, the DLLs or other resources including hybrid images 112 may be stored in memory 106 of a computing device 102. A hybrid image 112 may be used to replace (e.g. overwrite) an existing image (e.g., a standard bitmap image) that may be implemented by or referenced by an existing DLL or other resource. Hybrid image 112 may then be used as a common resource for applications 110 including legacy applications 202 and hybrid aware applications 204.

A legacy application 202 may interact with an API to obtain the standard bitmap image. However, as the standard bitmap image has been overwritten, the legacy application 202 may instead encounter the hybrid image 112 that has replaced the standard bitmap image. Further, the legacy application 202 and the API may operate without being aware of the multi-frame portion 116 of the hybrid image 116. In other words, the legacy application 202 and the API may not be configured to detect, use, decode or otherwise interact with the multi-frame portion and/or with images in multi-frame formats.

A bitmap image encoded in the bitmap portion is output without awareness of the multi-frame portion (block 404). Continuing the preceding example, the legacy application 202 and/or the API may reference a standard bitmap image maintained a DLL or other suitable resource. In this example, the API used by the legacy application 202 may be a legacy API that does not support the hybrid functionality. In other words, the legacy API may not be hybrid aware. However, the legacy API may be configured to interact (e.g., read/decode) the bitmap portion 114 of the hybrid image 112. Accordingly, the legacy application 202 and/or the legacy API may interact with the hybrid image 112 as though it was a standard bitmap file. For instance, the bitmap image encoded in the bitmap portion may be decoded using the imaging component 208 and output as a portion of a user interface legacy application 202. This interaction occurs without awareness of the multi-frame portion 116 of the hybrid image 112.

Thus, the hybrid image format described herein enables legacy applications 202 to interact with hybrid images 112 in a manner comparable to the way legacy applications 202 would interact with a standard bitmap image. Further, the legacy application 202 may be used "as is" to interact with the hybrid images 112, e.g., without having to reconfigure or redevelop the legacy application 202.

Figure 5:
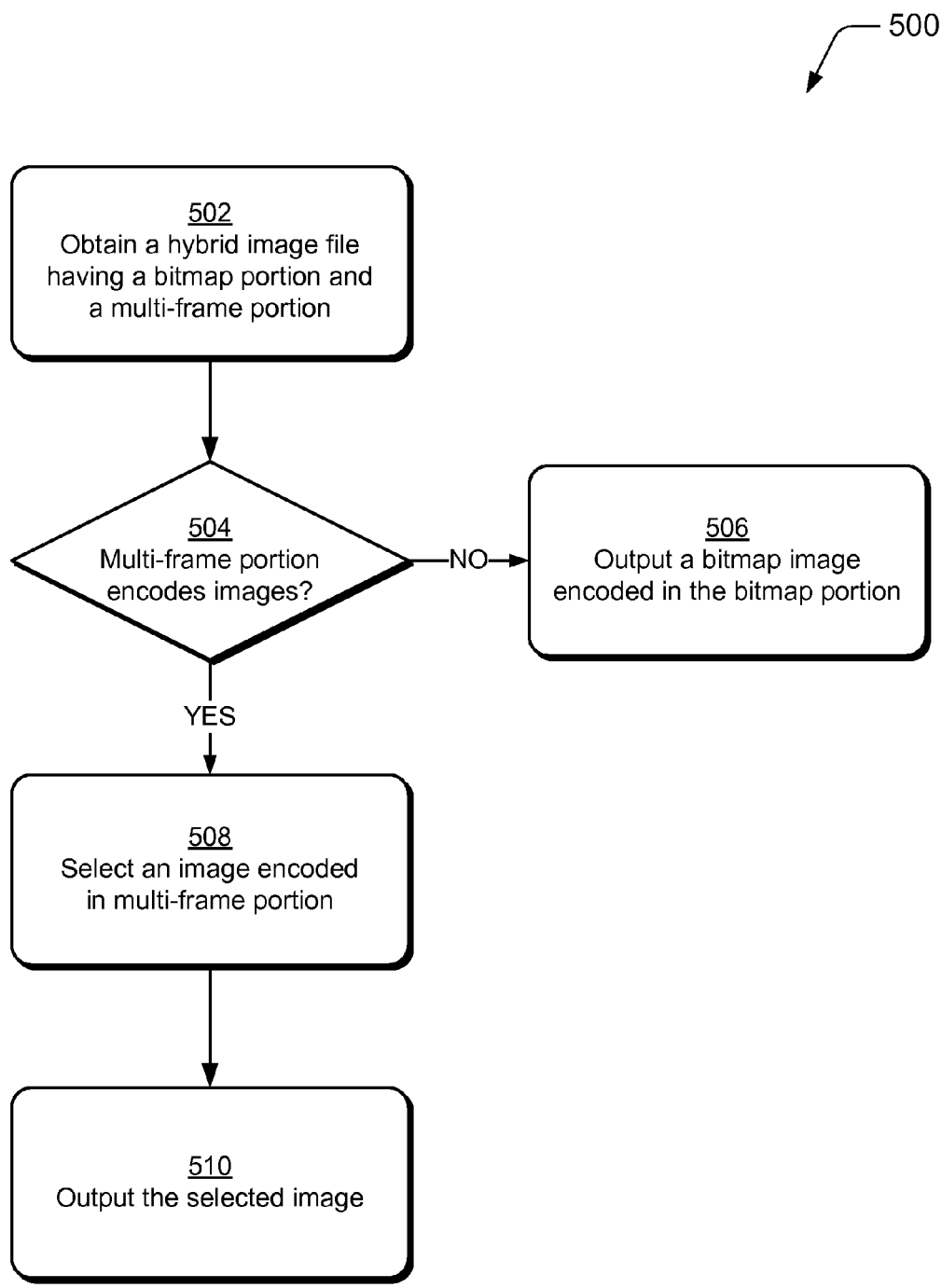
FIG. 5 depicts an example procedure in which a hybrid aware application interacts with a hybrid image to output a selected image.

FIG. 5 depicts an example procedure 500 in which a hybrid aware application interacts with a hybrid image to output a selected image. Procedure 500 may be performed by a hybrid aware application 204 when encountering a hybrid image 112 that has been created by a creation tool 120 as discussed with respect to procedure 300 of FIG. 3.

A hybrid image file is obtained having a bitmap portion and a multi-frame portion (block 502). For example, hybrid aware application 204 may obtain a hybrid image 112 that is maintained as a resource available through an operating system 108 of a computing device. Hybrid image 112 includes bitmap portion 114 and multi-frame portion 116 as previously discussed. For the purposes of this discussion, assume the hybrid image 112 encodes one or more alternate images for a selectable menu item that may be implemented by a variety of applications 110.

More particularly, hybrid aware application 204 may implement and/or interact with an image loading tool 118 as discussed herein to enable hybrid aware functionality. In an example, the image loading tool 118 is implemented as an API of operating system 108 that hybrid aware applications 204 may be configured to call. The image loading tool 118 may also be configured as an integrated component of an application 110 and/or as a stand-alone component of a computing device 102 that is operable with a variety of different applications 110. Thus, through interaction with the image loading tool 118, hybrid aware application 204 may obtain the hybrid image 112 that encodes the alternate images for the selectable menu item. As noted, the alternate images encoded in a hybrid image may have a variety of resolutions and include the standard bitmap image.

A determination is made as to whether the multi-frame portion encodes one or more image (block 504). For example, images processed by the image loading tool 118 may include both hybrid images 112 and other types of images. At least some of these images may be standard bitmap images. Accordingly, image loading tool 118 may include functionality to differentiate between hybrid images 112 and standard bitmap images. A variety of techniques maybe used by the image loading tool 118 to detect a hybrid image 112 and/or determine when a multi-frame portion 116 of the hybrid image 112 encodes images.

In one technique, the image loading tool 118 may reference detectable data within encountered images to differentiate between the images. A variety of detectable data is contemplated. For example, one or more flag fields or codes may be included in, or omitted from, the hybrid images 112 when created via creation tool 120. The image loading tool 118 may detect the existence or absence of such flag fields or codes to differentiate between hybrid images 112 and other type of images. For example, one of the additional header fields discussed in reference to TABLE 1 may encode information that is detectable by the image loading tool 118 to differentiate between various images. Thus, the detectable data may include specialized fields or codes indicative of whether an image is or is not a hybrid image 112.

In another example, detectable data used by an image loading tool 118 includes various file attributes of encountered images. Such attributes may include but are not limited to file creation or authoring dates, file types, size information, version numbers, and the like. A variety of other suitable file attributes are contemplated.

In one example technique involving the use of file attributes, size information is used by the image loading tool 118 to compare a bitmap size to an overall size of the file or resource. Size information to determine bitmap size may be included in a standard bitmap, as well as in a bitmap portion 114 of a hybrid image 112.

For instance, referring back to the example format of TABLE 1, the size of a bitmap may be arrived at by summing the BITMAPFILEHEADER size, BITMAPINFOHEADER biSize value, BITMAPINFOHEADER biSizeImage value, and the color table size (if applicable). Image loading tool 118 may compute the bitmap size from this information. Image loading tool 118 may then compare the computed value to an overall size of the file or resource. This comparison may indicate whether additional information (e.g., the multi-frame portion 116) has been concatenated to the bitmap image. For instance, when the overall size exceeds the bitmap size, this is indicative of the file having data defining one or more images contacted to the bitmap. Thus, image loading tool 118 may employ a variety of techniques to differentiate between hybrid images 112 and other images, and thereby determine when alternate images are available.

When no images are detected, a bitmap image encoded in the bitmap portion is output (block 506). In the preceding example, when the image loading tool 118 encounters a standard bitmap or when the image loading tool 118 determines that a hybrid image 112 does not encode alternative images, a bitmap image may be output. In the case of a hybrid image 112 encountered by the image loading tool 118, this is the bitmap image encoded in the bitmap portion 114. Accordingly, a relatively low resolution image for the selectable menu item may be output for incorporation in the user interface of the hybrid aware application 204.

When one or more images are detected, an image is selected from the one or more images encoded in the multi-frame portion (block 508) and the selected image is output (block 510). For example, the image loading tool 118 may determine through detectable data that the hybrid image 112 encodes data extending beyond the bitmap portion 114, e.g., the multi-frame portion 116. Accordingly, the image loading tool 118 may process the multi-frame portion 116 in various ways to select an image for the selectable menu item of the continuing example. Once selected, the selected image may be decoded and output to an application 110 requesting the image. In this case, an image having a relatively high resolution (e.g., relatively high compared to the standard bitmap image) may be output for the selectable menu item incorporated in the user interface of the hybrid aware application 204.

The processing to select and/or output an image from the multi-frame portion 116 may include various interactions with the imaging component 208. For instance, image loading tool 118 may interact with the imaging component 208 to identify an image format 210 of the multi-frame portion and/or to obtain codecs 212 corresponding to an identified image format 210. Image loading tool 118 may employ a variety of criteria to select an appropriate image from a plurality of images that may be encoded in a hybrid image 112.

For instance, the image loading tool 118 may be operable to enumerate the available frames in the multi-frame portion 116, such as identifying how many frames are provided, a resolution for each frame, and so forth. It is noted that in creating the multi-frame portion 116, the creation tool 120 may include attributes for each frame that the image loading tool 118 may use for the enumeration. For example, each frame may include attributes that indicate, a native resolution, a minimum resolution suitable for the frame, and so forth. Further, applications 110 may communicate preferences to the image loading tool 118 such as preferred resolution and/or formats, display capabilities, scaling data, and so forth.

Accordingly, image loading tool 118 may select an appropriate image based on the various criteria, which may include but are not limited to the described preferences and enumerated information. In an implementation, the image loading tool 118 may be configured to select that highest resolution image available that is suitable based on the criteria. Of course, if a suitable image is not available in the multi-frame portion 116, image loading tool 118 may instead output the bitmap image encoded in the bitmap portion 114.

Aspects of a hybrid image format have been described herein that may enable hybrid aware applications 204 to interact with hybrid images 112 in a sophisticated manner and may also enable legacy applications 202 to interact with hybrid images 112 in manner comparable to the way the legacy applications 202 would interact with a standard bitmap image.

CONCLUSION

Although the hybrid image format techniques have been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    defining a first portion of a hybrid image file to encode a bitmap image;
    defining a second portion of the hybrid image file to encode a plurality of images according to a multi-frame format; and
    concatenating the second portion to the first portion to create the hybrid image file that includes detectable data that is detectable to determine when the second portion encodes one or more alternate images to the bitmap image, wherein the first portion of the hybrid image file enables an application that is not configured to detect the second portion of the hybrid image file to output the bitmap image encoded in the first portion without awareness of the second portion of the hybrid image file.

2. A method as recited in claim 1, further comprising encoding the detectable data in the first portion to enable detection of the one or more alternate images in the second portion.

3. A method as recited in claim 1, wherein the detectable data comprises attributes of the hybrid image file.

4. A method as recited in claim 1, wherein the detectable data includes a size of the bitmap image encoded in one or more fields of the first portion, and wherein to determine when the second portion encodes the one or more alternate images, an application accessing the hybrid image file compares the size of the bitmap image to a size of the hybrid image file.

5. A method as recited in claim 1, wherein the bitmap image has a resolution of 96 dots per inch (DPI).

6. A method as recited in claim 1, wherein the multi-frame format is Tagged Image File Format (TIFF).

7. A method as recited in claim 1, wherein the first portion enables an application that does not support images encoded in the multi-frame format to output the bitmap image, wherein an application that is not configured to detect, use, and decode the images encoded in the multi-frame format does not support the images encoded in the multi-frame format.

8. A method as recited in claim 1, wherein the detectable data is detectable by an application that supports images encoded in the multi-frame format to output one or more of said alternate images.

9. A method as recited in claim 1, wherein the bitmap image has a first resolution and the one or more alternate images have resolutions greater than the first resolution.

10. A method as recited in claim 1, wherein the concatenating comprises a binary concatenation of the second portion to the first portion.

11. One or more computer-readable memory devices embodying a hybrid image file created in accordance with the method of claim 1.

12. A computing device comprising:
    a processor;
    a memory;
    an image file having a first portion encoding a bitmap image and a second portion configured to encode one or more higher resolution images in a multi-frame format, wherein the first portion of the image file enables modules that are not configured to detect the second portion of the image file to output the bitmap image and the second portion of the image file enables modules that are configured to detect the second portion of the image file to output at least one of the higher resolution images; and
    one or more modules stored in the memory and executable via the processor to interact with the image file to output at least one said image encoded in the image file.

13. A computing device as recited in claim 12, wherein the image file includes data detectable by at least one of said one or more modules to determine when the second portion encodes the one or more higher resolution images.

14. A computing device as recited in claim 13, wherein said one or more modules include:
    a first module configured to:
        obtain the image file;
        process the detectable data to determine when the second portion encodes the one or more higher resolution images;
        output the at least one of the higher resolution images when the second portion encodes the one or more higher resolution images; and
        output the bitmap image when the second portion does not encode the one or more higher resolution images; and
    a second module configured to:
    obtain the image file; and
    output the bitmap image, wherein the second module operates without awareness of the second portion.

15. A computing device as recited in claim 14, wherein:
    the detectable data includes a size of the bitmap portion; and
    to process the detectable data, the first module compares the size of the bitmap portion to a size of the image file.

* * * * *